June 3, 1930.  F. L. MAIN  1,761,927
DISK WHEEL
Filed April 9, 1928  2 Sheets-Sheet 1
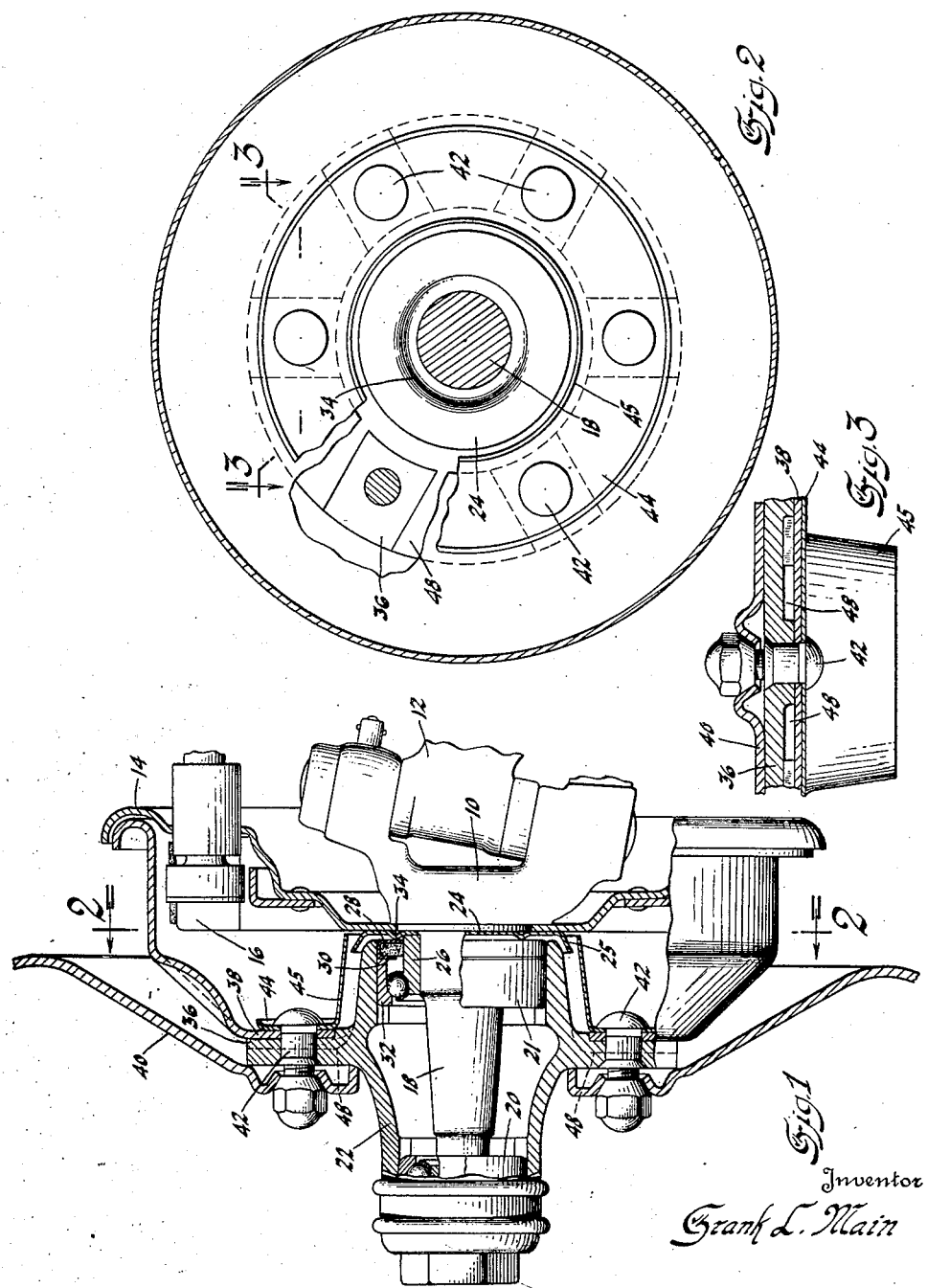
Inventor
Frank L. Main June 3, 1930.  F. L. MAIN  1,761,927
DISK WHEEL
Filed April 9, 1928    2 Sheets-Sheet 2

Inventor
Frank L. Main
By Blackmore, Spencer & Hinch
Attorney

Patented June 3, 1930

1,761,927

UNITED STATES PATENT OFFICE

FRANK L. MAIN, OF JACKSON, MICHIGAN, ASSIGNOR TO GENERAL MOTORS CORPORATION, OF DETROIT, MICHIGAN, A CORPORATION OF DELAWARE

DISK WHEEL

Application filed April 9, 1928. Serial No. 268,752.

This invention relates to vehicle wheels and more particularly to a deflector to dispose of such lubricant as may escape from the wheel hub.

In conventional four-wheel-brake systems now in general use on motor vehicles, a brake drum is provided on the inner side of both front wheels for the action thereon of internal expanding brake shoes, usually lined with friction material. One of the difficulties frequently encountered with such systems lies in the failure of the braking surfaces to take hold. This may be attributed to the fact that some of the lubricant supplied to the front wheel works out of the hub and is thrown, under the influence of centrifugal force during the rotation of the wheel, into the brake drum, eventually reaching the friction surfaces thereby lessening their effectiveness and destroying the braking action.

It is an object of the present invention to provide an arrangement for deflecting the lubricant that escapes through the hub and prevent it reaching the braking surfaces.

Other objects and advantages will be apparent from the following specification taken in connection with the accompanying drawings, in which Figure 1 is a vertical sectional view through a wheel hub and brake drum showing one form of the invention that is especially adapted for use with disk wheels.

Figure 2 is a sectional view taken on line 2—2 of Figure 1.

Figure 3 is a section taken on line 3—3 of Figure 2.

Figure 4:
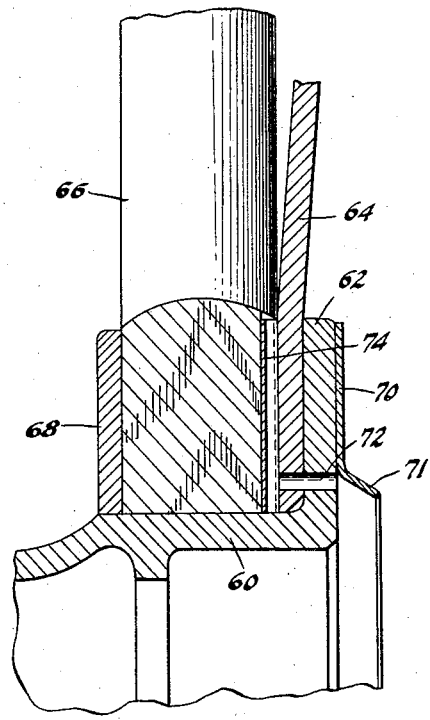
Figures 4, 5 and 6 are sectional views through portions of a wheel hub and a wood spoke wheel each illustrating a slightly modified embodiment of the invention.

Referring to the drawings the reference character 10 indicates a conventional front wheel knuckle pivotally supported on the end of the axle 12 and provided with a spindle 18, and the numeral 14 refers to a backing plate carried by the knuckle for supporting a brake shoe 16, adapted to be operated in the usual manner. Carried by the spindle 18 is a pair of spaced anti-friction bearing elements 20 and 21 for the hollow wheel hub 22, which is to be packed with grease or other suitable lubricant, and a gasket or felt washer 28 preferably backed by a pair of rings 30, is carried within the hub and bears against the innermost race ring 26 of the bearing element 21 to seal the hub against lubricant leakage. Interposed between the race ring 26 and a shoulder on the knuckle 10 is a plate or disk 24 having a bead 34 abutting the adjacent packing ring 30 to hold the packing washer in position, the ring also being provided with an annular peripheral flange 25 projecting over the inner edge of the wheel hub 22.

Detachably mounted on the annular flange 36 of the wheel hub 22 by a series of bolts 42 is a disk wheel 40, the same bolts also serving to fasten to the inner face of the flange, the web 38 of the brake drum and the annular flange 44 of a conical or tapered deflector hood or shield 45, surrounding the wheel hub in spaced relation therewith and extending beyond the peripheral flange 25 of the plate 24. Radial grooves or depressions 48 formed in the inner face of the hub flange 36 communicate with the space between the tapered hood 45 and hub 22 and lead to the outside of the brake drum. It will be understood that any lubricant that is allowed to escape from the interior of the hollow hub past the retainer gasket 28 will be guided or deflected by the plate 24 into the space defined by the hood 45 and, under the action of centrifugal force upon rotation of the wheel, will move down the inclined surface of the hood and pass out through the radial grooves 48. The surplus lubricant, therefore, is prevented from reaching the friction surfaces of the brake.

In the modified construction shown in Figure 4 the wheel hub 60 is provided with an annular flange 62 on one side of which are secured the brake drum 64, wheel spoke 66, and clamping plate 68. A plate or disk 70 secured on the inner face of the flange 62 is provided with an inclined flange 71 which directs lubricant thrown out of the hub into a series of aligned openings 72 formed in the flange 62 and drum 64 at spaced intervals about the hub, each of which openings or passageways leads to a trough or tube 74 located in radial grooves in the wood spokes 66. Thus the escaping lubricant is intercepted by a deflector ring and directed outside the drum.

Figure 5:
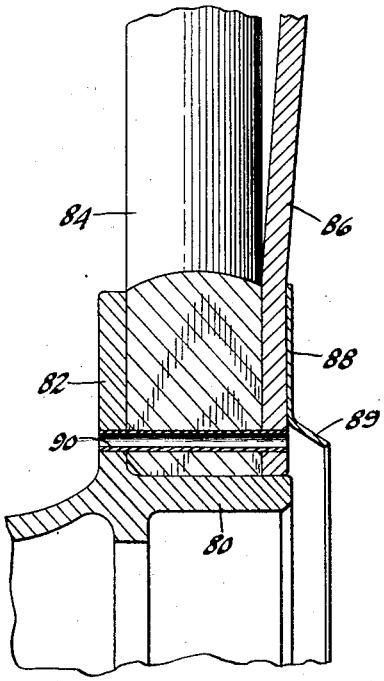

Figure 5 illustrates the same principle applied to a different type of hub. In this case the hub 80 is provided with an annular flange 82 intermediate its ends to which is secured the wheel spokes 84 and brake drum 86. The deflector plate 88 formed with an inclined flange 89 conducts the lubricant to the tubes or conduits 90 spaced around the hub and extending through the drum 86, spokes 84, and flange 82 through which the lubricant is by-passed from the interior of the brake drum.

Figure 6:
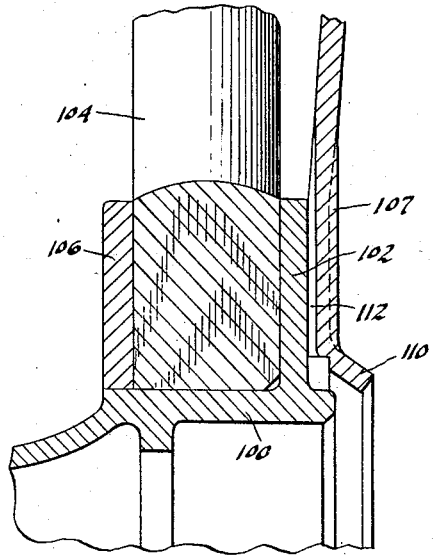

In Figure 6 the hub 100 is provided with an annular flange 102 on one side of which the clamping ring 106 secures a spoke 104, the brake drum 107 being secured at the other side of the flange. In this case the brake drum has an inclined annular flange 110 that deflects the lubricant into a series of grooves or passages 112 afforded by the depressions formed in the brake drum.

It will be obvious that the above constructions may be variously modified in one manner or another. While the invention has been described as applied to front wheels it will be apparent that it is readily adaptable for use with rear wheels and with either internal or external brakes, or a combination of the two, and in such other places where it is desirable to deflect escaped lubricant from friction surfaces.

I claim:—

1. The combination with a non-rotatable spindle, of a hollow wheel hub rotatably mounted thereon and adapted to contain lubricant, a brake drum carried by the hub, a deflector associated with the drum on the interior thereof, an outlet passageway communicating with the deflector and a second deflector associated with the spindle at the end of the hub to direct lubricant thrown from the hub into the first mentioned deflector.

2. The combination with a non-rotatable spindle, of a hollow wheel hub rotatably mounted thereon and adapted to contain lubricant, a sealing gasket at the end of the hub to prevent escape of lubricant, a brake drum carried by the hub, a conical hood associated with the drum on the interior thereof and surrounding the hub in spaced relation therewith, an outlet leading from the space between the hub and hood, and a plate carried by the spindle and having a portion overlying the end of the hub to direct such lubricant as may pass said gasket into said hood.

In testimony whereof I affix my signature.

FRANK L. MAIN.